United States Patent [19]

Mita

[11] Patent Number: 4,782,398
[45] Date of Patent: Nov. 1, 1988

[54] IMAGE PROCESSING APPARATUS

[75] Inventor: Yoshinobu Mita, Kawasaki, Japan

[73] Assignee: Canon Kabushiki Kaisha, Tokyo, Japan

[21] Appl. No.: 161,266

[22] Filed: Feb. 18, 1988

Related U.S. Application Data

[63] Continuation of Ser. No. 12,322, Feb. 9, 1987, abandoned.

[30] Foreign Application Priority Data

Feb. 14, 1986 [JP] Japan .................................. 61-29068
Feb. 14, 1986 [JP] Japan .................................. 61-29069
Feb. 14, 1986 [JP] Japan .................................. 61-29070

[51] Int. Cl.$^4$ .............................................. H04N 1/40
[52] U.S. Cl. .................................... 358/280; 358/283; 358/298; 375/22
[58] Field of Search ............... 358/280, 283, 284, 296, 358/298, 302; 375/22

[56] References Cited

U.S. PATENT DOCUMENTS 3,197,558 7/1965 Ernst ................................... 358/302
3,393,269 7/1968 Zeuthen .............................. 358/298
3,882,270 5/1975 Ogawa ................................ 358/260
4,346,409 8/1982 Ishida ................................. 358/280
4,485,408 11/1984 Kamizyo ............................ 358/283
4,535,413 9/1985 Shiota ................................. 358/80
4,626,923 12/1986 Yoshida ............................. 358/283

Primary Examiner—Howard W. Britton
Attorney, Agent, or Firm—Fitzpatrick, Cella, Harper & Scinto

[57] ABSTRACT

An image processing apparatus having versatility and expandability for obtaining a high-quality reproduced image is provided. The image processing apparatus of the invention has an LUT for generating an image signal, a first pattern signal generator for generating a first pattern signal, a comparator for processing the image signal using the first pattern signal and outputting a first pulse width modulation signal, a second pattern signal generator for generating a second pattern signal different from the first pattern signal, another comparator for processing the image signal using the second pattern signal and outputting a second pulse width modulation signal, and an OR gate for synthesizing the first and second pulse width modulation signals.

15 Claims, 13 Drawing Sheets

|  | IMAGE TYPE | | |
|---|---|---|---|
|  | CHARACTER | PICTURE | MIXED |
| X |  | O | I |
| Y | I | O | O |
| SELECT SIG | I | O | A |

FIG. 10

| | IMAGE TYPE | | |
|---|---|---|---|
| | CHARACTER | PICTURE | MIXED |
| X | | 0 | 1 |
| Y | 1 | 0 | 0 |
| SELECT SIG | 1 | 0 | A |

| -1 | 0 | 1 |
|---|---|---|
| -1 | 0 | 1 |
| -1 | 0 | 1 |

| 1 | 1 | 1 |
|---|---|---|
| 0 | 0 | 0 |
| -1 | -1 | -1 |

IMAGE PROCESSING APPARATUS

This application is a continuation of application Ser. No. 012,322 filed Feb. 9, 1987, now abandoned.

BACKGROUND OF THE INVENTION

1. Field of the Invention

The present invention relates to an image processing apparatus for obtaining a reproduced image.

2. Related Background Art

Conventionally, a dither method, a density pattern method, and so on which use a threshold value matrix are known as a method to binary code an image including a halftone image. When binary coding is performed with one of these methods, however, an edge portion of a character or a diagram becomes non-continuous, and the resolution and the image quality are degraded. In order to eliminate these drawbacks, a mixed image including character and halftone images is to be processed, its edge portion is picked up by image area separation and is subjected to spatial filtering in a digital manner, so that only the edge portion is enhanced. In order to subject an edge portion to spatial filtering in a digital manner, however, a plurality of line memories and so on are required, resulting in a large circuit size and an excessive load to the overall apparatus. Also, if only image data is subjected to edge enhancement in a digital manner, a sufficient effect cannot be obtained.

As a method to replace this binary coding using the dither or density pattern method described above, a method is proposed by the present applicant wherein a periodic pattern signal having a predetermined pattern is compared with an image signal and pulse width modulation is performed, thereby performing binary coding. When binary coding is performed with this method, however, an edge portion of a character or a diagram becomes noncontinuous, and the resolution and the image quality become degraded. In order to eliminate these problems, when a mixed image including character and halftone images is to be processed, its edge portion is picked up by image area separation. The period of the pattern signal is set short for the edge portion, so that degradation in resolution at the edge portion is prevented.

This method of changing the period of the pattern signal for preventing degradation in resolution is quite effective. However, when the period of the pattern signal is changed, its amplitude changes, as shown in FIG. 2. Referring to FIG. 2, VAmin and VAmax are the minimum and maximum amplitudes of an image signal. As a pattern signal (a triangular wave in FIG. 2), a pattern signal having a low frequency as indicated by a solid line is used for a halftone image, and a pattern signal having a high frequency as indicated by a broken line is used for an edge portion. As is easily shown from FIG. 2, when the amplitude of the pattern signal is adjusted to allow effective binary coding of the halftone image, the amplitude of the pattern signal (broken line portion) corresponding to the edge image is lowered, and accurate binary coding can no longer be expected. This problem is particularly serious when the image tonality (the characteristic or nature of an image signal) of an image varies, because the period of the pattern signal must be variously changed in this case.

It is generally difficult to generate a plurality of analog signals having predetermined patterns having same amplitudes and different periods with a single simple circuit. Therefore, as a means to overcome the above problem, it is proposed to generate pattern signals having the same amplitudes and different periods in advance, and one period is selected among these signals in accordance with the image tonality. However, analog circuits must be provided in units of periods, adjustment therefor is cumbersome, and above all versatility and expandability of the circuit suffer.

SUMMARY OF THE INVENTION

It is an object of the present invention to eliminate the above drawbacks.

It is another object of the present invention to improve an image processing apparatus.

It is still another object of the present invention to provide an image processing apparatus which can obtain a high-quality reproduced image.

It is still another object of the present invention to provide an image processing apparatus which can obtain an excellent reproduced image with a simple apparatus configuration.

It is still another object of the present invention to provide an image processing apparatus which can provide a high-quality reproduced image at a high speed.

It is still another object of the present invention to provide an image processing apparatus which can obtain a reproduced image having both excellent image tonality and resolution.

It is still another object of the present invention to provide an image processing apparatus which can correctly reproduce an original image.

It is still another object of the present invention to provide an image processing which having expandability and versatility.

It is still another object of the present invention to provide an image processing apparatus which can perform optimum pulse width modulation in accordance with the image tonality.

The above and other objects, features and advantages of the present invention will become apparent from the following description and the claims taken in conjunction with the accompanying drawings.

BRIEF DESCRIPTION OF THE DRAWINGS

FIG. 10 shows a truth table of a SELECT signal;

DETAILED DESCRIPTION OF THE PREFERRED EMBODIMENTS

(First Embodiment)

The first embodiment of the present invention will be described in detail with reference to the accompanying drawings.

(Principle of Embodiment)

The present invention is applicable of a pattern signal is a periodic signal. However, the following explanation will be made for a case of a triangular wave for the sake of convenience.

Figure 3A:
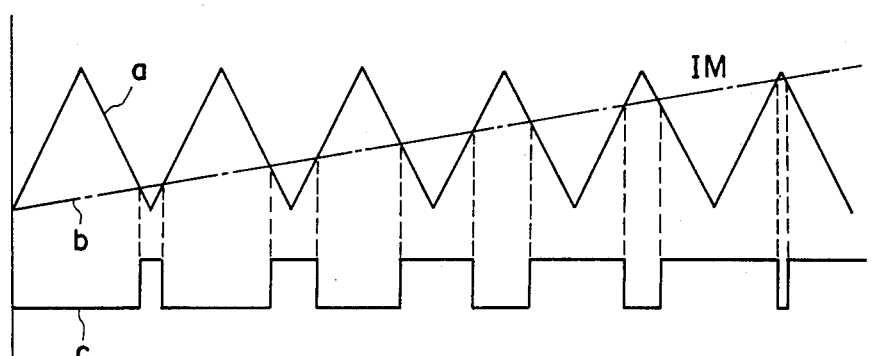
Figure 3B:
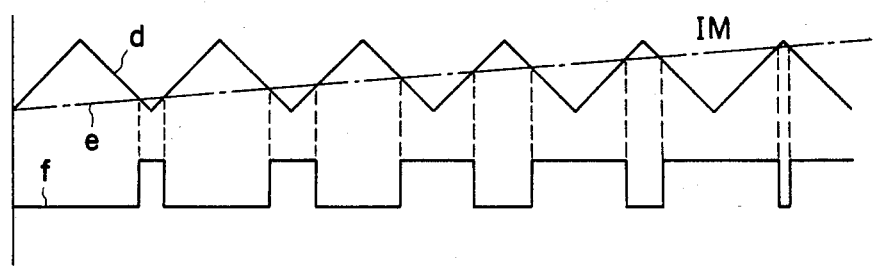

When a triangular wave a and analog image data IM(b) of FIG. 3A are compared and binary coding is performed, an output c shown in FIG. 3A is obtained. When the voltage levels of the triangular wave a and the analog image data IM(b) are decreased to ½, a triangular wave d and analog image data IM(e) shown in FIG. 3B are obtained. When the image data IM(e) is binary-coded by the triangular wave d, a wave f shown in FIG. 3B is obtained. The waves c and f are the same, as is seen by a simple calculation. The following proposition is thus obtained.

(Proposition 1)

When a certain multi-level signal is subjected to binary coding by pulse width modulation using a triangular wave of a certain periodic signal, the result is the same as a binary coding result which is obtained when the amplitude of the triangular wave is set to 1/N and the amplitude of the multi-level signal is also set to 1/N.

Figure 3C:
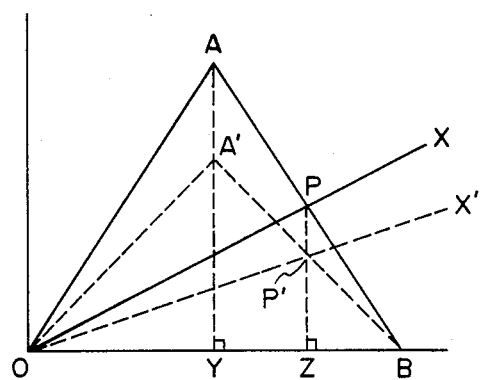

FIG. 3C is a schematic chart to explain this. Referring to FIG. 3C, an original triangular wave OAB and an original signal OX which is to be subjected to pulse width modulation are shown. A point P is an intersection of a line segment AB and the signal OX, and a point Z is a binary code change point of the point P. Assume that the amplitude of the triangular wave OAB is set to 1/N to obtain a triangular wave OA′B. From the similarity of the triangular waves, AY:A′Y=PZ:P′Z=N where P′ is the intersection of line segments A′B and PZ. Thus, a line OX′ has an inclination 1/N that of a line OX. Thus, the binary coding result is the same when the amplitude of the multi-level signal is set to 1/N.

Figure 4:
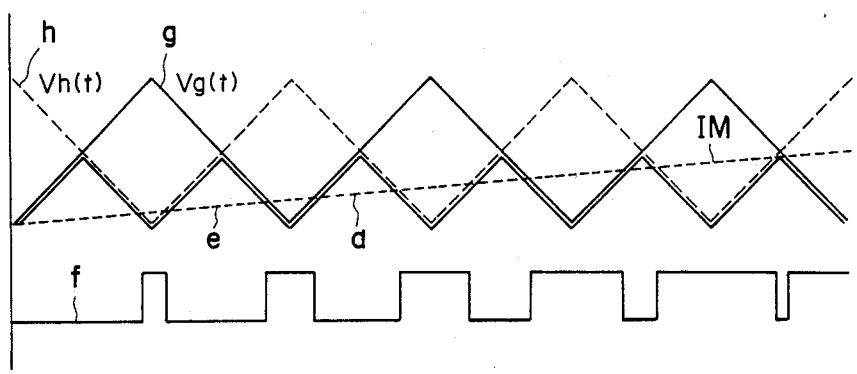

Explanation will be made referring to FIG. 4. A triangular wave g having a frequency ½ (i.e., twice period) that of the triangular wave a (FIG. 3A) and a triangular wave h having a phase shifted by a half cycle (180°) from that of the triangular wave g are shown. As is apparent from FIG. 4, a triangular wave synthesized from the triangular waves g and h is identical to the triangular wave d of FIG. 3. A relation $$Vd(t) = \text{Min}(Vg(t), Vh(t))$$

is established between the voltage level Vd(t) of the triangular wave d (FIG. 4) at a certain time t, and the voltages Vg(t) and Vh(t) of the triangular waves g and h at the time t, respectively. The maximum amplitude of Vd(t) is ½ that of Vg(t) or Vh(t). More specifically, the binary-coded output f of FIG. 4 is equal to a binary-coded output obtained when data IM(e) (FIG. 4) is compared with a lower voltage level (Vd(t)) of the triangular waves g and h. The above relation suggests that the binary-coded output obtained using Vd(t) is equal to a logical OR or sum of the binary-coded outputs of the voltages Vg(t) and Vh(t).

Figure 5:
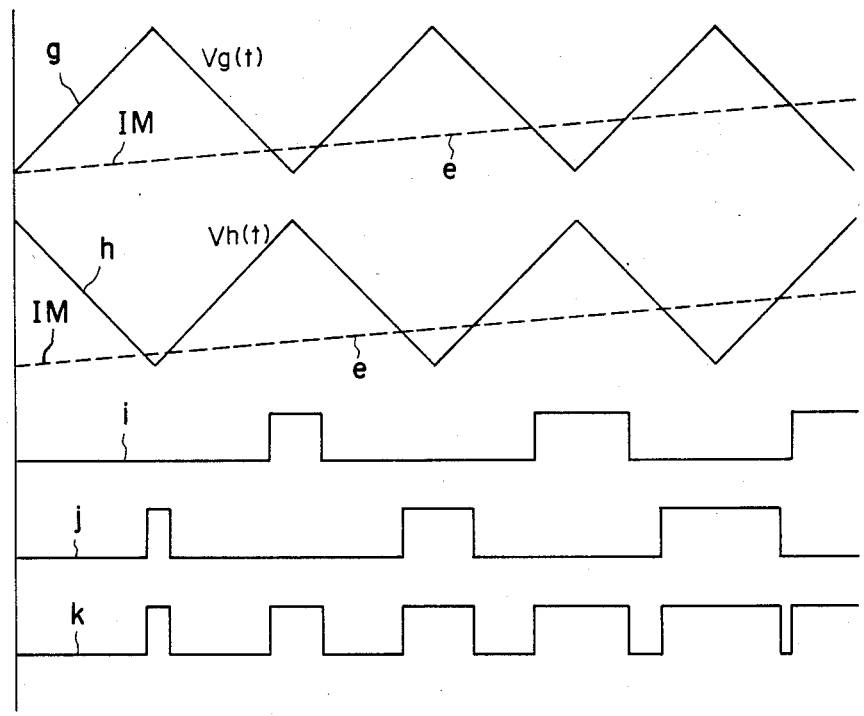

More specifically, as shown in FIG. 5, when the triangular waves g and h are compared with the image data IM(e) having a ½ density and image data IM(e), respectively, and the comparison results are binary-coded, results as indicated by i and j are obtained. The logical sum of the signals i and j is a signal k. The binary-level signal k is equal to the binary-coded output c of FIG. 3A and the outputs f of FIGS. 3B and 4.

TABLE 1

| Binary Coding with Threshold Value g | Binary Coding with Threshold value h | Logical Sum |
|---|---|---|
| 0 | 0 | 0 |
| 1 | 0 | 1 |
| 0 | 1 | 1 |
| 1 | 1 | 1 |

As shown in Table 1, when the ½-density image data IM(e) is binary-coded by the triangular wave d as the threshold value, the data IM(e) is binary-coded by Min(Vg(t), Vh(t)) at the time t. This result coincides with the logical sum of the outputs when binary coding is performed with the trinagular waves g and h. In other words, together with the above proposition 1, the following proposition can be obtained.

(Proposition 2)

Generally, when a signal to be subjected to binary coding is binary-coded by N triangular waves having phases shifted by 1/N of a period from each other, and the logical sum of the resultant binary-level signals is obtained, the result is equal to the result when the same signals are binary-coded by, as a threshold value, a triangular wave having an amplitude 1/N and a frequency N times those of the triangular waves.

Therefore, when image data is multiplied by 1/N and is binary-coded by N triangular waves having phases shifted by 1/N of a period, and the logical sum of the resultant values is obtained, the logical sum is equal to the binary coding result of the 1/N-density image data using the triangular wave having an amplitude 1/N and a frequency N times those of the triangular waves. This corresponds to the result when the value equal to the image data of a size 1 is binary-coded by a triangular wave having an amplitude 1 and a frequency 1/N.

An explanation will be made for a case wherein image data including areas of different image tonalities is binary-coded. Assume that a single image data is binary-coded by a pattern signal having a certain period. In this case, when the image tonality changes, the period of the pattern signal is changed (e.g., the frequency is increased) in the prior art technique. In contract to this, in this embodiment, the period is not changed but first the density of the image data is changed. The density-changed image data is binary-coded by pattern signals prepared in advance which have phases equally shifted from each other. Then, the logical sum of the binary-coded signals is obtained. As described above, this logical sum is equal to the binary coding result obtained when the period of the pattern signal is changed. It is noted that it is much easier to generate a plurality of pattern signals having phases shifted from each other than to generate a plurality of pattern signals having different periods. This is because phase change can be achieved in a digital manner, as will be described in the following embodiment. Also, density change can be achieved quickly and easily by constituting a look-up-table (LUT) with a ROM and so on.

Figure 6:
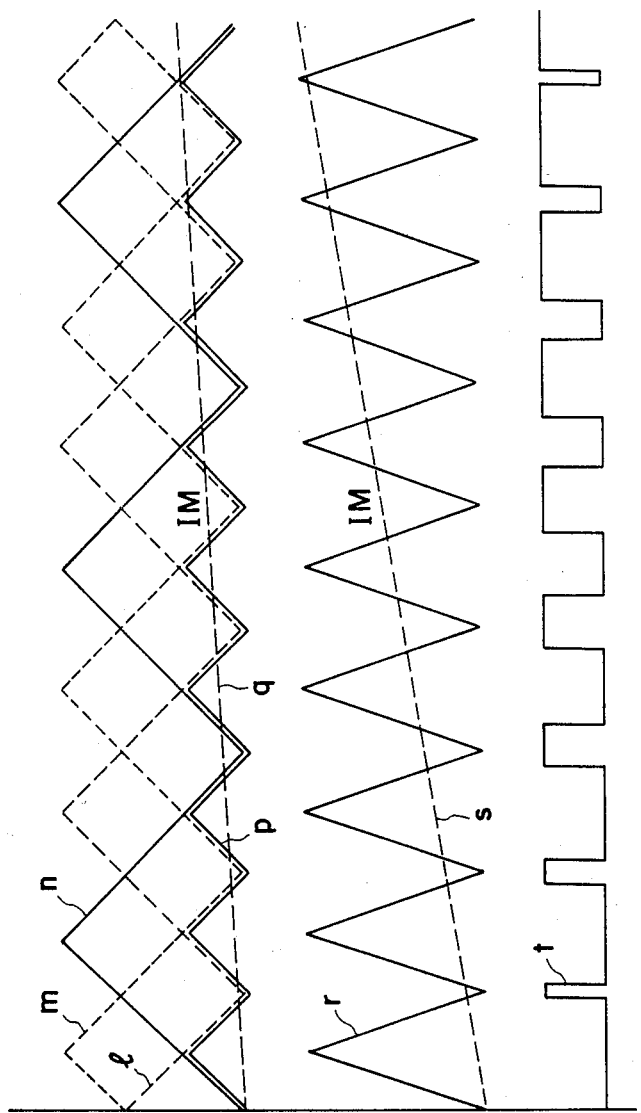

FIG. 6 shows a case wherein N=3 and is a chart showing binary coding of a triangular wave r as a threshold value and analog image data IM(s), wherein t is the binary coding result. The result obtained when data IM(q) having a density ⅓ that of the original image data is binary-coded by a triangular wave p having an amplitude ⅓ that of the triangular wave r is also equal to t. This binary coding result is equal to the logical sum of the binary coding results of the data IM(q) by triangular waves 1, m and n, respectively, that have phases shifted from each other by ⅓ of a period, as described above.

This will be described in more detail. If any one of the binary-coded outputs obtained by comparing the N triangular waves and the image data is "1", that is, if IM(t)>VN(t) (where VN(t) is a level of a given triangular wave N at a time t and IM(t) is a level of image data at the time t), one of the triangular waves that yielded an output "1" must include Min(v1(t), V2(t), . . .) (N is the number of triangular waves).

(Practical Embodiment)

Figure 1:
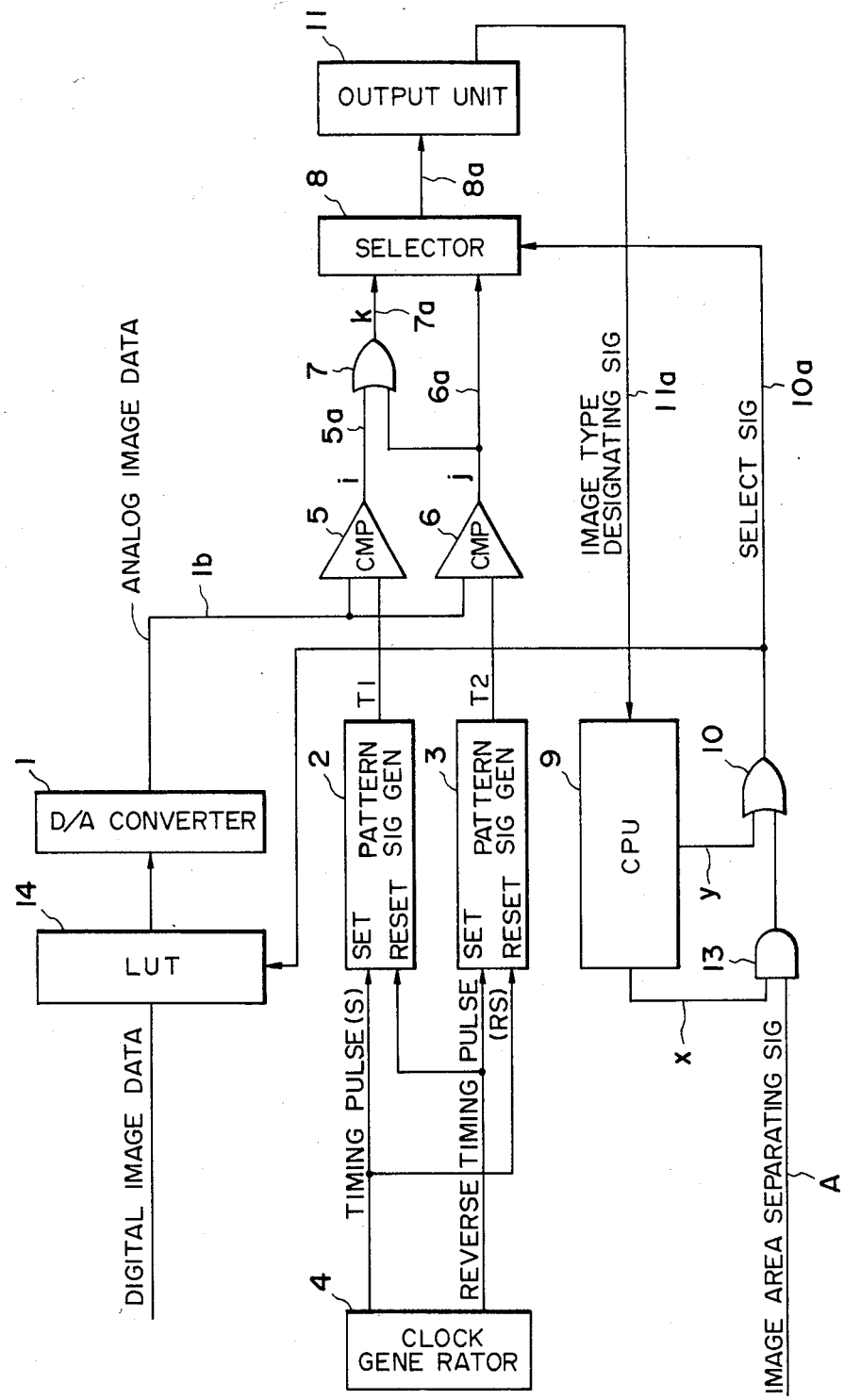
FIG. 1 is a detailed circuit diagram of an image processing apparatus according to a first embodiment of the present invention.
Figure 2:
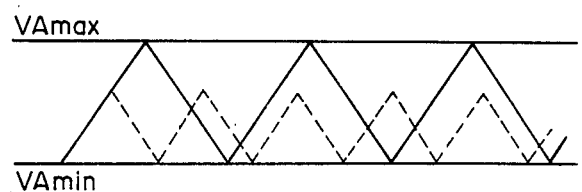
FIGS. 2, 3A to 3C, 4, 5 and 6 are charts for explaining the principle of the embodiment shown in FIG. 1.

FIG. 1 shows an embodiment of the present invention wherein N=2 in the principle of the invention described above. Referring to FIG. 1, digital image data (D-IMAGE) stored in a memory of an image reader or a computer (not shown) is input to a look-up-table (LUT) 14 constituted by a ROM and so on. The edge portion of the image data D-IMAGE is multiplied by 1/N (N=2) by the LUT 14. More specifically, the LUT 14 has two tables that are switched by a SELECT signal 10a to be described later. When the SELECT signal 10a is "1" representing an edge portion of an image, the table which outputs an image data having a density level ½ that of the input image data D-IMAGE is selected. When the SELECT signal 10a is "0" representing a non-edge portion of the image, the table which outputs the input image data D-IMAGE as the output image data is selected.

Output data from the LUT 14 is input to a D/A converter 1 to be converted into analog data and is input to comparators 5 and 6.

Figure 8:
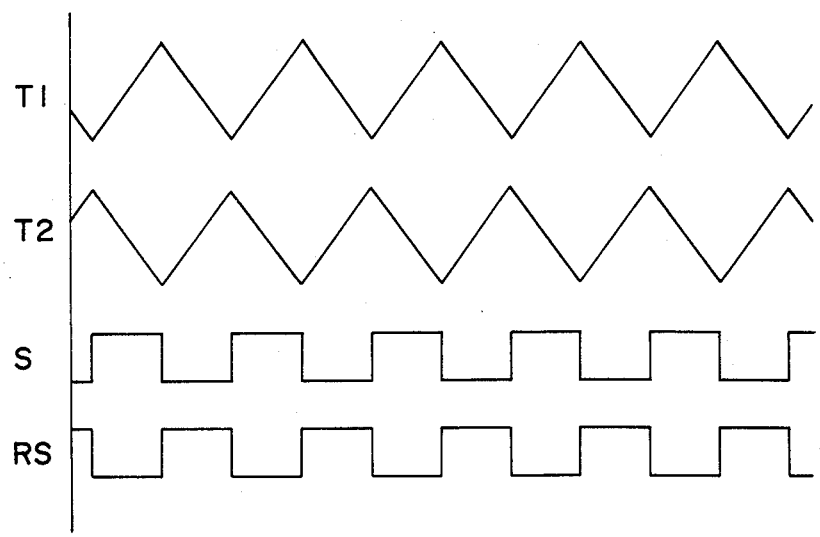
FIG. 8 is a timing chart of generation of triangular waves.
Figure 9:
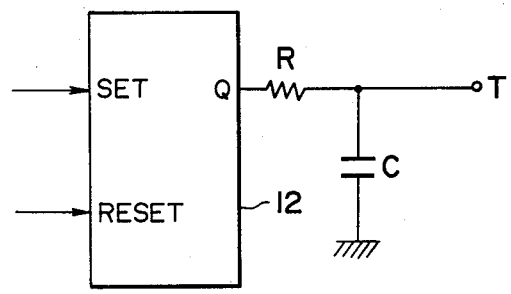
FIG. 9 shows an example of a triangular wave generator.

The comparators 5 and 6 compare the analog image data with signals T1 and T2 and perform binary coding. The signals T1 and T2 are triangular waves and have phases shifted from each other by 180°, as shown in FIG. 8. Note that a pattern signal is a triangular wave as shown in FIG. 3, for the sake of simplicity. A clock generator 4 generates a timing pulse (S) having a duty ratio of 50%:50% and a reverse timing pulse (RS) having a phase shifted by 180° from the timing pulse S. These pulses S and RS are as shown in the timing chart of FIG. 8 and are input to pattern signal generators 2 and 3, respectively. The pattern signal generators 2 and 3 respectively have an arrangement as shown in FIG. 9. When a signal "1" is input to the set terminal of a flip-flop 12, its output Q is set to "1". The voltage level at a terminal T shown in FIG. 9 is increased substantially linearly by an integrator RC. When a signal "1" is input to the reset terminal, the output Q is set to "0", and the voltage at the terminal T drops. Assume that signals S, RS, RS and S are applied to the set terminal of the pattern signal generator 2, the reset terminal thereof, the set terminal of the pattern signal generator 3, and the reset terminal thereof, respectively. Then, the outputs of the pattern signal generators 2 and 3 become like the pattern signals T1 and T2, as shown in FIG. 8, and are phase-shifted from each other by 180°. Therefore, in order to generate a plurality of pattern signals having phases equally shifted from each other, in the case of FIGS. 1 and 9, the signals S and RS may be equally phase-shifted from each other in a digital manner.

When the analog image data as the output from the D/A converter 1 can be represented by the data IM(e) of FIG. 5, the data IM(e) is compared with the triangular waves T1(g) and T2(h) as threshold values by the comparators 5 and 6, and voltage waveforms i (5a of FIG. 1) and j (6a of FIG. 1) are output. An OR gate 7 receives the voltage waveforms i and j and outputs a signal k (7a of FIG. 1). The signal k is equal to a signal obtained when the input image signal D-IMAGE is not multiplied by 1/N (N=2) but D/A-converted and binary-coded by a triangular wave (a of FIG. 3A) having the same amplitude as and a frequency N times (N=2) those of the triangular wave g (FIG. 5). More specifically, the image signal 7a (k) is a result of pulse width modulation using a frequency twice that of the triangular wave T1 or T2 and is assumed to retain well the image data of the edge portion. Thus, when the edge portion is image-area separated by the SELECT signal 10a, the selector 8 selects the image signal 7a. Otherwise, the selector 8 selects a binary-level signal 6a (or 5a).

In order to prevent the density of the data D-IMAGE from being decreased at a portion excluding the edge portion, a SELECT signal 10a is input to the LUT 14 to control density decrease. The SELECT signal will now be described.

A SELECT signal is generally an image area separating signal. Normally, data D-IMAGE is stored in, e.g., a line memory, a predetermined image area (block of an image) is extracted, and the image tonality in that image area is calculated. The image tonality of this image area is designated as the image tonality of the central pixel. Various methods are possible for calculating this image tonality. For example, primary differentiating filtering is applied to cover the image area in horizontal and vertical directions, and whether the image area is an edge portion or a halftone portion is discriminated from the calculation value filtered. The obtained signal is externally input as an image area separating signal A in the embodiment shown in FIG. 1.

The embodiment of FIG. 1 has the following arrangement so that the judgment of the operator of an output unit 11 can be included, thereby improving the quality of the reproduced image from the output unit 11.

This is because a more correct image reproduction is sometimes possible when human judgment is added than image area judgment is performed only by signal processing. More specifically, the signal A to be input to an AND gate 13 in FIG. 1 is an image area separating signal for detecting an edge portion, and is supplied from an image reader or a memory unit. The operator who operates the output unit 11 designates whether an original (an image to be output) to be input is a diagram image such as a character, a halftone image such as a picture, or a mixed image of them. This designation is output to a central processing unit 9 as an image type designating signal 11a in FIG. 11. In response to the image type designating signal 11a, the central processing unit 9 outputs a signal X or Y in accordance with a truth table as shown in FIG. 10. The signals X and Y are input to the gates 13 and 10, respectively, of FIG. 1. Thus, when an image area separating signal A is input to the data 13, as shown in FIG. 1, the SELECT signal 10a as the output from the gate 10 becomes as shown in FIG. 10.

The central processing unit 9 outputs "1" to the OR gate 10 when the output image is a character image, and "0" to the AND gate 13 and the OR gate 10 when the output image is a picture image. The central processing unit 9 also outputs "1" and "0" to the AND gate 13 and the OR gate 10, respectively, when the output image is a character-picture mixed image. As a result, "1" is input to the selector 8 and the LUT 14 from the OR gate 10 when a character image is designated, "0" is input to them when a character image is designated, and "1" and "0" representing edge and non-edge portions, respectively, are input from the OR gate 10 to the selector 8 and the LUT 14 based on the image area separating signal A when a mixed image is designated.

Figure 11:
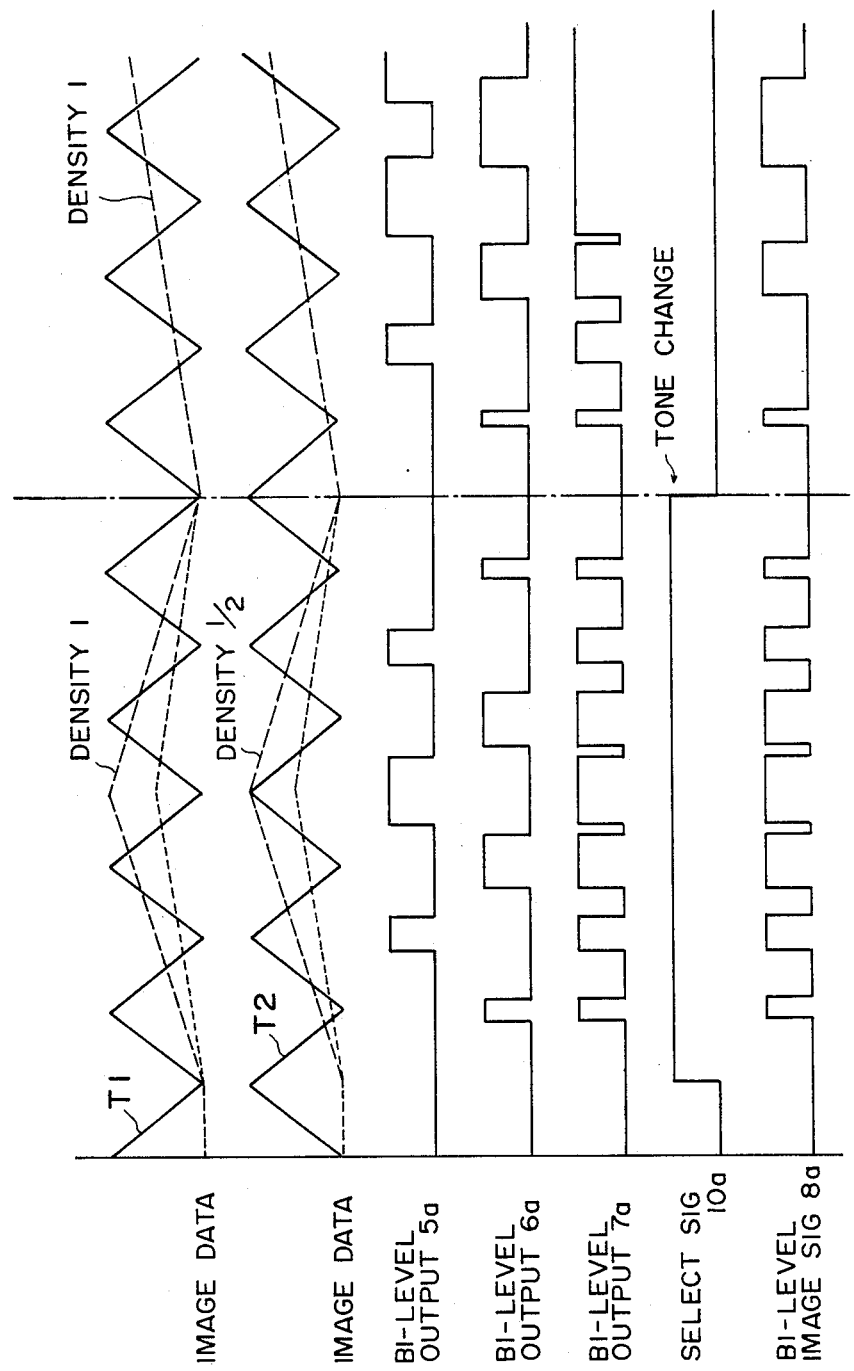
FIG. 11 is a timing chart of binary coding operation when image data is input to the circuit shown in FIG. 1.

FIG. 11 shows binary coding by the image processing apparatus according to this embodiment. In FIG. 11, image data changes from an edge to halftone portion. Since the LUT 14 changes its operating state from ½ to 1 times as the SELECT signal 10a changes from "1" to "0", the density of the image data changes from a density of ½ times to that of 1 times. When the SELECT signal 10a is "1", a binary-level output (pulse width modulation signal) 7a is selected, and when the SELECT signal 10a is "0", a binary-level output (pulse width modulation signal) 6a is selected. An output from the selector 8 is input to the output unit 11 to perform image formation. The output unit 11 is a conventional laser beam printer. A binary-level output 8a is used as a drive signal for the laser beam printer.

As is seen from FIG. 11, the binary-level image signal 8a has an improved resolution at an edge portion. Binary coding by pattern signals having phases shifted from each other, according to this embodiment, also has an effect to enhance the edge portion of image data.

(Application to General Pulse Width Modulation)

Binary coding described above is binary coding by means of pulse width modulation in an image processing field. However, in general pulse width modulation as well, binary coding by changing modulation frequency is important. In this case, a plurality of frequency-modulated signals having phases shifted from each other, as described above, are prepared, and binary coding is performed using them. When multi-level pulse width modulation is performed, the logical sum of these binary-level outputs becomes the multi-level pulse width modulated output, thus greatly simplifying signal processing. As a result, a change in modulation frequency can be easily dealt with, and the image processing apparatus has expandability.

According to the embodiment described above, a/N portions of an image are binary-coded by N triangular waves having different phases and a logical sum thereof is obtained. Then, a similar effect to that when binary coding is performed using a triangular wave having a frequency N times the original one can be obtained, and a problem of amplitude incoincidence which exists in the prior art technique and occurs when the period of a pattern signal is changed can be solved. Furthermore, since such triangular waves having phases shifted from each other can be obtained relatively easily, the circuit configuration becomes simple, and the image processing apparatus can have expandability. In addition, N triangular wave generators are easily adjusted due to exactly the same circuit configurations and small variations, and have stabler performance than in a case wherein a triangular wave having a frequency N times the original one is generated.

(Modification of First Embodiment)

In the above embodiment, N=2. When N=3, it is apparent that N triangular wave generators and N comparators, respectively, may be prepared. In this case the clock generator apparently supply to the triangular wave generators signals having duty ratio of 1:1 and phases shifted from each other by 1/N of a single period.

As a signal to be supplied to the selector 8, signals for N=2, N=3, N=4, and so on, respectively, are generated in the similar manner to the above embodiment, and are selected by the selector 8 that receives all of these signals. Then, a similar output to that when binary coding is performed by a triangular wave having a desired frequency can be obtained. This fact can easily be understood.

A pattern signal is not limited to a triangular wave but can be a sine or sawtooth wave.

Figure 7:
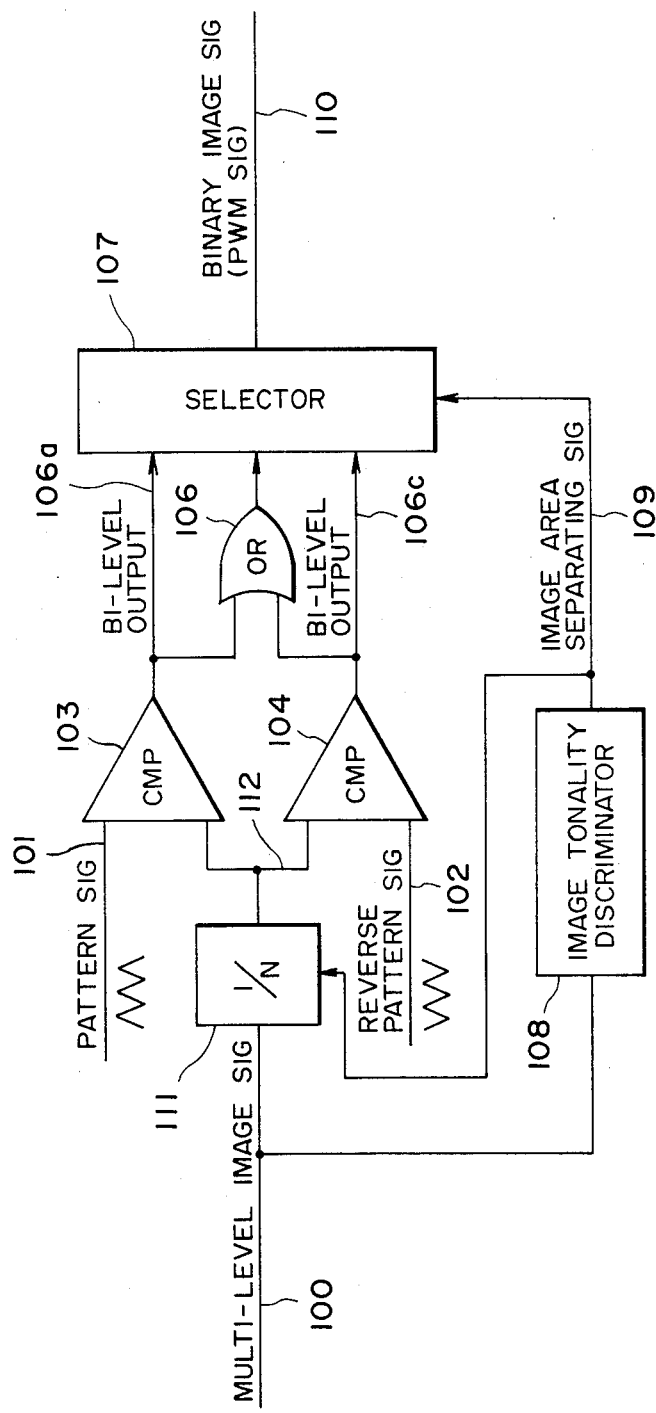
FIG. 7 is a circuit diagram of an image processing apparatus having a similar function to the apparatus shown in FIG. 1.

FIG. 7 shows an image processing apparatus having a similar function to that of the image processing apparatus shown in FIG. 1.

The image processing apparatus of the embodiment shown in FIG. 7 has an image tonality discriminator 108, a 1/N value decrease unit 111, comparators 103 and 104, an OR gate 106, and a selector 107. The image tonality discriminator 108 discriminates the tonality of an input multi-level image signal 100 when N=2. The 1/N value decrease unit 111 decreases or does not decrease the density of the multi-level image signal 100 to 1/N the original one in response to an image area separating signal 109 supplied from the image tonality discriminator 108, and outputs a signal 112. The comparator 103 compares a pattern signal 101 having a predetermined periodic pattern with the signal 112 as a threshold level and obtains a binary-level output 106a. The comparator 104 compares a reverse pattern signal 102, having substantially the same pattern as the pattern signal 102 and a period shifted by substantially half cycle of the signal 102, with the signal 112 as a threshold value and obtains a binary-level output 106c. The OR gate 106 obtains a binary-level output 106b as a logical sum of the binary-level outputs 106a and 106c. The selector 107 selects one of the binary-level outputs 106a, 106b and 106c as a binary-level image signal 110 based on the image area separating signal 109.

With the arrangement of FIG. 7, the binary-level output 106b from the OR gate 106 has an improved resolution at particularly an edge portion like the binary-level signal k of FIG. 5. The gray scale of the binary-level output 106b at a portion excluding the edge portion is maintained. Particularly, the edge portion is the same as a case when binary coding is performed by a pattern signal having the same amplitude as that of the original one and a frequency N times (twice in the case of FIG. 7) the original one. Therefore, a conventional problem arising due to amplitude incoincidence between image and pattern signals can be solved.

Figure 12:
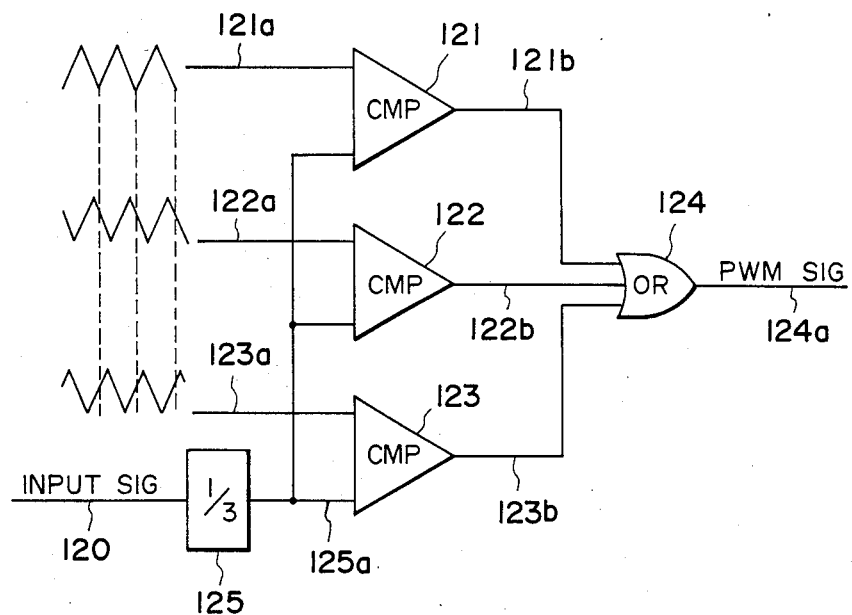
FIG. 12 is a diagram of a circuit for obtaining a pulse width modulation (PWM) signal by using three triangular waves having the same periods and amplitudes and different phases.

FIG. 12 is a diagram of a circuit for obtaining a pulse width modulation signal from an input image signal using three pattern signals having the same periods and amplitudes and different phases.

The pulse width modulation circuit of the embodiment shown in FIG. 12 has a value decrease unit 125, three comparators 121, 122 and 123, and an OR gate 124. Modulation signals 121a, 122a and 123a have the same patterns and phases shifted from each other by ⅓ of a single period. When N=3, the value decrease unit 125 decreases the absolute value of an input image signal 120, which is to be subjected to pulse width modulation, to ⅓ the original value. The comparators 121, 122 and 123 compare an input image signal 125a having an absolute value ⅓ the original value with modulation signals 121a, 122a and 123a, respectively, as the threshold values, and output corresponding binary-level outputs. The OR gate 124 obtains a logical sum binary-level output 124a which is a logical sum of three binary-level outputs 121b, 122b and 123b from the comparators 121, 122 and 123. Therefore, an output which is the same as the result when the input image signal is binary-coded by a pattern signal having a frequency three times that of the pattern signal 121a can be obtained from the OR gate 124.

With the above arrangement, an input image signal can be converted into a pulse width modulation signal at a high resolution without using a triangular wave having a high frequency.

(Second Embodiment)

Figure 13:
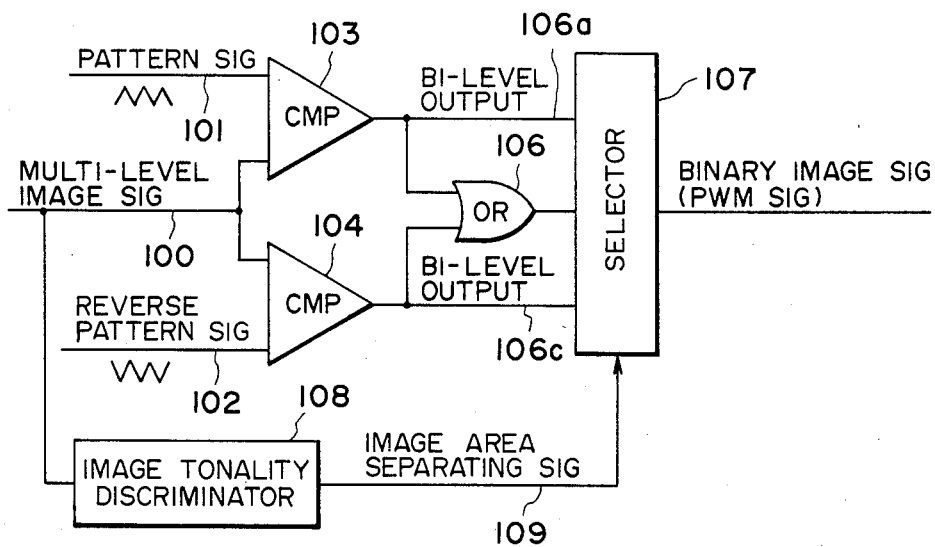
FIG. 13 is a circuit diagram of an image processing apparatus according to a second embodiment of the present invention.

The second embodiment of the present invention will be described with reference to FIGS. 13 to 19. Referring to FIG. 13, the same reference numerals denote the portions having the same functions as those in FIG. 7. When N=2, the image processing apparatus of the embodiment shown in FIG. 13 has comparators 103 and 104, an OR gate 106, an image tonality discriminator 108, and a selector 107. The comparator 103 compares a pattern signal 101 having a predetermined periodic pattern with a multi-level image signal 100 as a threshold value, and obtains a binary-level output 106a. The comparator 104 compares a reverse pattern signal 102, having substantially the same pattern as that of the pattern signal 101 and a period shifted by substantially half the period of the pattern signal 101, with a multi-level image signal 100 as a threshold value and obtains a binary-level output 106c. The OR gate 106 obtains a binary-level output 106b as a logical sum of the binary-level outputs 106a and 106c. The image tonality discriminator 108 discriminates the image tonality of the multi-level image signal 100. The selector 107 selects one of the binary-level outputs 106a, 106b, 106c as a binary-level image signal 110 based on an image area separating signal 109 supplied from the image tonality discriminator 108.

With the arrangement of FIG. 13, the binary-level output 106b supplied from the OR gate 106 has an enhanced edge portion, as shown in FIG. 17(e) to be described later. The gray scale of the binary-level output 106b at a portion excluding the edge portion is maintained. Therefore, an optimum binary-level image signal can be obtained from an image of an original including a diagram while the gray level and the resolution are maintained.

Figure 14:
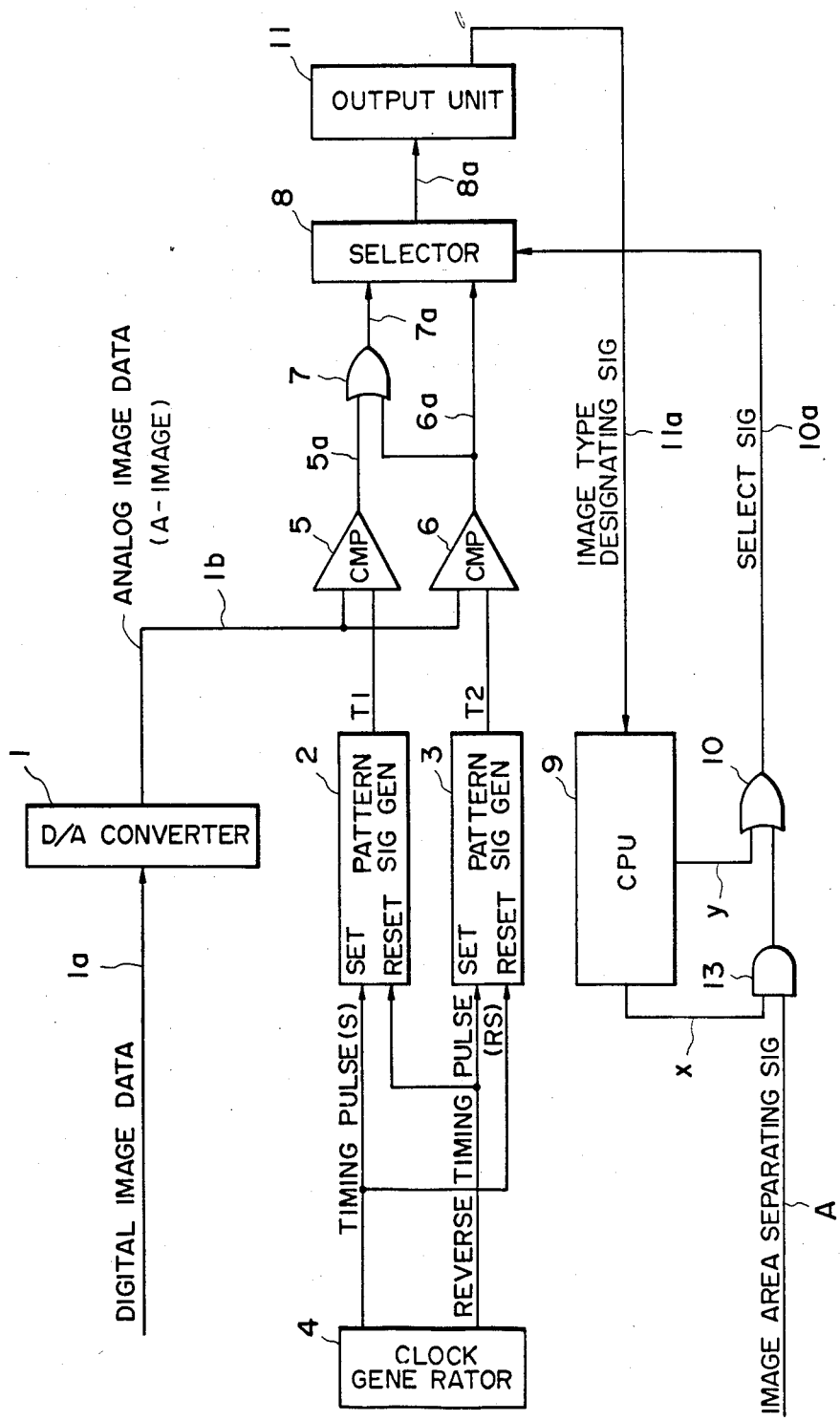
FIG. 14 is a diagram of a circuit embodying the circuit shown in FIG. 13.
Figure 15:
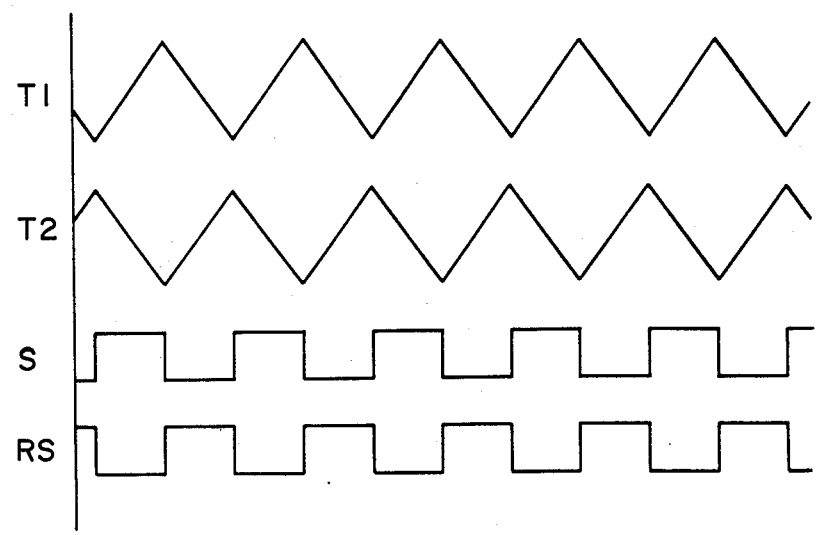
FIG. 15 is a timing chart of pattern signals and signals as the sources of the pattern signals.

FIG. 14 practically embodies the embodiment of FIG. 13. Referring to FIG. 14, the same reference numerals denote the same portions having the same functions as those of FIG. 1. Digital image data (D-IMAGE) stored in a memory of an external unit (not shown), such as an image reader or a computer, is input to a D/A converter 1, converted into analog image data A-IMAGE), and input to comparators 5 and 6. The comparators 5 and 6 compare the analog image data (A-IMAGE) with pattern signals T1 and T2, respectively, and perform binary coding. The signals T1 and T2 are supplied from pattern signal generators 2 and 3, respectively, and have predetermined patterns and phases shifted from each other by 180°, as shown in FIG. 15. Note that the pattern signals are triangular waves as shown in FIG. 15 for the sake of simplicity. A clock signal generator 4 generates a timing pulse (S) and a reverse timing pulse (RS) that are shifted from each other by 180°, as shown in the timing chart of FIG. 15. The timing pulses S and RS are input to the pattern signal generators 2 and 3, respectively.

Figure 16:
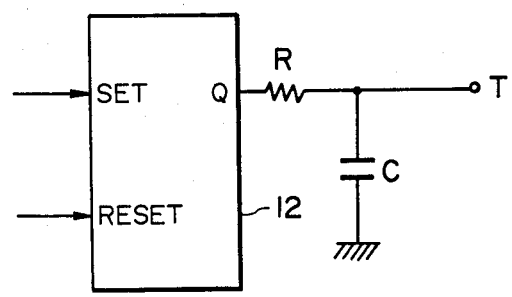
FIG. 16 is a circuit diagram of an example of a pattern signal generator.

Both the pattern signals 2 and 3 have an arrangement as shown in FIG. 16. Referring to FIG. 16, when a signal "1" is input to the set terminal of a flip-flop 12, its output Q becomes "1". An integrator RC increases the voltage level of a terminal T in FIG. 16 substantially linearly. When a signal "1" is input to the reset terminal of the flip-flop 12, its output Q becomes "0", and the voltage at the terminal T drops. Therefore, when signals S, RS, RS and S are applied to the set terminal of the pattern signal generator 2, the reset terminal thereof, the set terminal of the pattern signal generator 3, and the reset terminal thereof, respectively, the outputs of the pattern signal generators 2 and 3 become pattern signals T1 and T2, as shown in FIG. 15, that are phase-shifted from each other by 180°.

Figure 17:
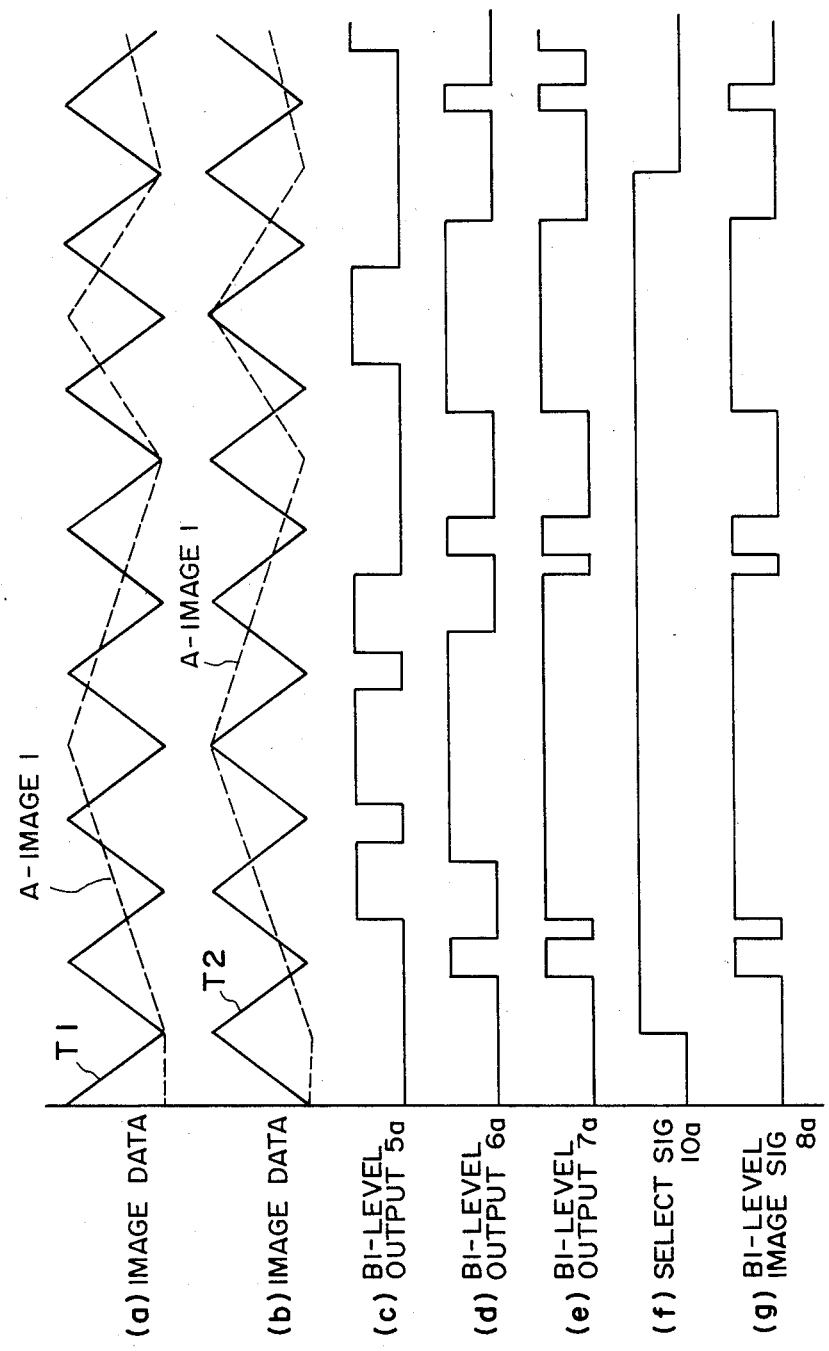
FIG. 17 is a timing chart for explaining the operation of the embodiment shown in FIG. 14.

When the analog image data (A-IMAGE) is signal A-IMAGE1 as indicated by a broken line in FIG. 17, the comparators 5 and 6 compare signal A-IMAGE1 with the pattern signals T1 and T2, respectively, and obtain binary-level signals 5a and 6a, as shown in FIGS. 17(c) and 17(d), respectively. The OR gate 7 shown in FIG. 14 receives the binary-level signals 5a and 6a and outputs a binary-level signal 7a as shown in FIG. 17(e). The binary-level signal 7a is a binary level signal which enhances the edge portion of the image. Assuming that the peak portion of a voltage wave of the signal A-IMAGE1 represents a solid line of a character, the binary-level signal 7a is assumed to clearly reproduce the solid line compared with the binary-level signal 5a or 6a. This is attributable to the following reason.

When the change in image signal A-IMAGE1 is moderate (when the original is a halftone image), the halftone can be reproduced well since the period of the pattern signal T1 or T2 is short compared to the change. When the change in signal A-IMAGE1 is abrupt, however, if binary coding is performed only by a single pattern signal (e.g., the pattern signal T1 in the case of FIG. 17), information at the edge portion of the signal A-IMAGE1 may sometimes be lost, as shown in FIG. 17(c). Particularly, when the pattern signal T1 (or T2) has the same phase (ascends or descends in the same manner) as the signal A-IMAGE1 at an edge portion, much information is lost and the edge portion is blurred. In this case, however, a threshold value signal (the signal T2 in the case of FIG. 17) having an opposite phase maintains information at the edge portion and loses information at a non-edge portion, as shown in FIG. 17(d). Therefore, the signal 7a as the output from the OR gate 7 becomes a binary-level image signal totally having enhanced edge portions.

Figures 18, 19A, 19B, 20:
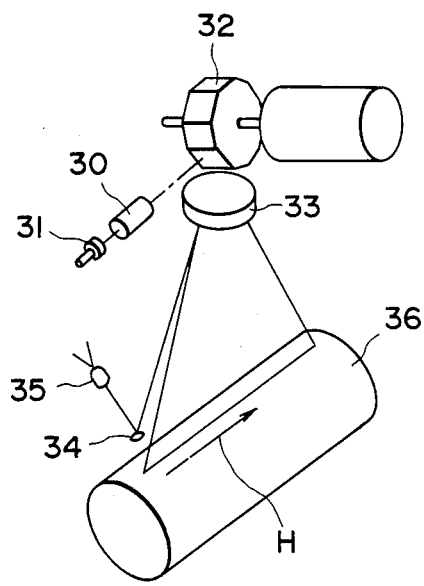
FIG. 18 shows a truth table for explaining image area separation.
FIGS. 19A and 19B show tables of spatial filters when image area separation is performed in a digital manner.
FIG. 20 schematically shows a laser beam printer to which the present invention is applicable.

In this manner, when an edge portion is to be enhanced, a means is required for discriminating the edge portion. This discrimination is usually performed by an image area separating signal. For example, an image area separating signal 109 may be directly input to the selector 107 as a selector signal, as shown in FIG. 13. In order to perform image area separation in a digital manner, when primary differential filtering shown in FIGS. 19A and 19B is performed against digital image data and the filter value is larger than a predetermined value, a portion corresponding to the central pixel of the filter is determined to be an edge portion. When image area separation is performed in an analog manner, it can be done by supplying an analog image signal to a differentiator and determining how many portions of the analog image signal have differential values larger than a predetermined threshold value in unit area.

In the embodiment shown in FIG. 14, a judgment of an operator of the output unit 11 can be added in image area separation without directly using an image area separating signal, unlike in FIG. 13. This is because more correct image reproduction can sometimes be possible by adding human judgment than a case wherein image area determination is performed only by signal processing. More specifically, a signal A input to the AND gate 13 of FIG. 14 is an image area separating signal (the same as the signal 109 of FIG. 13) for detecting an edge portion and is supplied from an image reader or a memory unit. The operator who wishes to operate the output unit 11 designates whether an input original (an original to be output) is a diagram image such as a character, a halftone image such as a picture, or a mixed image of them. This designation is output to a central unit 9 as an image type designating signal 11a in FIG. 14. In accordance with the image type designating signal 11a, the central processing unit 9 outputs signals X and Y based on the truth table as shown in FIG. 18. The signals X and Y are input to the gates 13 and 10, respectively, shown in FIG. 14. Therefore, when the image area separating signal A is input to the gate 13, as shown in FIG. 14, a SELECT signal 10a as the output from the gate 10 becomes as shown in FIG. 18.

The central processing unit 9 outputs "1" to the OR gate 10 when the output image is a character image, and "0" to the AND gate 13 and the OR gate 10 when the output image is a picture image. The central processing unit 9 also outputs "1" and "0" to the AND gate 13 and the OR gate 10, respectively, when the output image is a character-picture mixed image. As a result, when a character image is designated, "1" is input to the selector 8 from the OR gate 10. When a picture image is designated, "0" is input to the selector 8 from the OR gate 10. When a mixed image is designated, "1" and "0" representing edge and non-edge portions, respectively, are input to the selector 8 from the OR gate 10 in accordance with the image area separating signal A.

The SELECT signal 10a is the signal shown in FIG. 17(f). The selector 7 selectively outputs as an output 8a a binary-level signal 7a, which is an output from the OR gate 7, and a binary-level signal 6a when the SELECT signal is "1" and "0", respectively.

FIG. 17(f) shows an example of the SELECT signal to be input to the selector 8. In response to the SELECT signal, the selector 8 outputs an output as shown in FIG. 17(g). The output from the selector 8 is input to the output unit 11 and image formation is performed. The output unit 11 is a conventional laser beam printer, and the binary-level signal 8a is used as a drive signal for the laser beam printer.

As described above, according to the second embodiment of the present invention, the solid portion of a character can be enhanced with a quite simple apparatus configuration, and a halftone portion of a character can be reproduced with good quality, while the gray level and the resolution are maintained well. Furthermore, image data having a high density is read out as a solid area by the function of the OR gate 7 so that a character can be reproduced better.

Not only an image area separating signal extracted in a digital manner is used but also a judgment of an operator is used in determining image area separation, so that higher-quality image reproduction is possible.

In the above embodiment, the pattern signal is a triangular wave. However, the same effect can be obtained if the pattern signal is a pattern pulse having gradual increase and decrease portions, such as a sine wave or a sawtooth wave.

In the above embodiment, two pattern signal generators are provided to generate signals having phases shifted from each other by 360°/2=180°. However, another embodiment is also possible wherein N pattern signal generators and N comparators are provided. In this case, the phases of the pattern signals of the N pattern signal generators are set to be shifted from each other by 360°/N. In order to obtain a signal corresponding to the binary-level signal 7a of the embodiment shown in FIG. 14, the pattern signal outputs from the N pattern signal generators are binary-coded by the corresponding comparators, and the logical sum of the binary outputs is obtained as a signal corresponding to the binary-level signal 7a. In this case, the larger the value of N, the better the effect.

FIG. 20 is a schematic perspective view of a scanning optical system of a laser beam printer (raster scanning printer) to which the present invention is applicable. The scanning optical system shown in FIG. 20 corresponds to, e.g., the output unit 11 shown in FIGS. 1 and 14. Referring to FIG. 20, the scanning system has a semiconductor laser for emitting a laser beam modulated in accordance with the pulse width modulation signal described above. The optical beam modulated by the semiconductor laser 31 is collimated by a collimator lens 30 and is optically polarized by a rotating polygon mirror (applying means) 32 having a plurality of reflecting surfaces. The polarized optical beam forms an image on a photosensitive drum 36 by a focusing lens 33 called an fθ lens and performs beam scanning. In beam scanning, the distal end of one scanning line of the optical beam is reflected by a mirror 34 and guided to a beam detector 35. A beam detection (BD) signal from the beam detector 35 is used as a known horizontal sync signal of a scan direction H (horizontal direction).

The present invention is not limited to the embodiments described above, and various modifications can be made within the scope defined in the appended claims.

What I claim is:

1. An image processing apparatus comprising:

image signal generating means for generating an image signal;

first pattern signal generating means for generating a first pattern signal;

means for processing the image signal using the first pattern signal and outputting a first pulse width modulation signal;

second pattern signal generating means for generating a second pattern signal different from the first pattern signal;

means for processing the image signal using the second pattern signal and outputting a second pulse width modulation signal; and means for synthesizing the first and second pulse width modulation signals.

2. An apparatus according to claim 1, wherein said first pulse width modulation signal outputting means comprises first comparing means for comparing the first pattern signal with the image signal and outputting the first pulse width modulation signal, and said second pulse width modulation signal outputting means comprises second comparing means for comparing the second pattern signal with the image signal and outputting the second pulse width modulation signal.

3. An apparatus according to claim 1, wherein said synthesizing means calculates a logical sum of the first and second pulse width modulation signals.

4. An apparatus according to claim 1, wherein the first and second pattern signals have the same periods and amplitudes and different phases.

5. An apparatus according to claim 4, wherein the first and second pattern signals are triangular waves.

6. An apparatus according to claim 1, wherein said image signal generating means comprises converting means for converting input digital image data and outputting converted digital image data, and analog image signal generating means for digital/analog converting the converted digital image data output from said converting means and generating an analog image signal.

7. An apparatus according to claim 6, wherein said converting means has a function to convert a density level of the input digital image data.

8. A pulse width modulation signal generating apparatus comprising:

signal input means;

means for converting the level of a signal input from said input means;

first pattern signal generating means for generating a first pattern signal;

means for processing a converted signal output from said converting means using the first pattern signal and outputting a first pulse width modulation signal;

second pattern signal generating means for generating a second pattern signal different from the first pattern signal;

means for processing the converted signal output from said converting means using the second pattern signal and outputting a second pulse width modulation signal; and means for synthesizing the first and second pulse width modulation signals.

9. An apparatus according to claim 8, wherein said input means inputs an image signal.

10. An apparatus according to claim 8, wherein said synthesizing means calculates a logical sum of the first and second pulse width modulation signals.

11. An apparatus according to claim 8, wherein the first and second pattern signals have the same periods and amplitudes and different phases.

12. An apparatus according to claim 11, wherein the first and second pattern signals are triangular waves.

13. An image processing apparatus comprising:

image signal generating means for generating an image signal;

means for generating first and second pattern signals;

means for processing the image signal using the first pattern signal and outputting a first pulse width modulation signal;

means for processing the image signal using the second pattern signal and outputting a second pulse width modulation signal;

means for synthesizing the first and second pulse width modulation signals; and selecting means for selecting an output from said synthesizing means in accordance with an input designating signal.

14. An apparatus according to claim 13, wherein said image signal generating means comprises means for converting the level of the image signal, and said converting means switches a conversion mode of the image signal in accordance with the designating signal.

15. An apparatus according to claim 13, further comprising means for discriminating an image tonality of the image signal, and wherein the designating signal is output in accordance with a discrimination result of said discriminating means.

* * * * *

UNITED STATES PATENT AND TRADEMARK OFFICE
CERTIFICATE OF CORRECTION

PATENT NO. : 4,782,398

DATED : November 1, 1988

INVENTOR(S) : YOSHINOBU MITA

Page 1 of 2

It is certified that error appears in the above-identified patent and that said Letters Patent is hereby corrected as shown below:

COLUMN 2

Line 33, "image processing which" should read --image processing apparatus--.

COLUMN 3

Line 23, "of a pattern signal" should read --to a pattern signal which--.

COLUMN 4

Line 67, "contract" should read --contrast--.

COLUMN 6

Line 66, "than image" should read --than when image--.

COLUMN 7

Line 14, "data 13," should read --gate 13,--.

COLUMN 8

Line 22, "generator" should read --generators--.
    Line 41, "decraase" should read --decrease--.
    Line 55, "signal 102" should read --signal 101--.

COLUMN 9

Line 16, "single period." should read --signal period--.

UNITED STATES PATENT AND TRADEMARK OFFICE
CERTIFICATE OF CORRECTION

PATENT NO. : 4,782,398
DATED : November 1, 1988
INVENTOR(S) : YOSHINOBU MITA

It is certified that error appears in the above-identified patent and that said Letters Patent is hereby corrected as shown below:

COLUMN 10

Line 11, "A-IMAGE)," should read --(A-IMAGE),--.
    Line 25, "pattern signals" should read --pattern signal generators--.

COLUMN 11

Line 58, "thc" should read --the--.
    Line 65, "selector 7" should read --selector 8--.

Signed and Sealed this

Ninth Day of May, 1989

Attest:

DONALD J. QUIGG

Attesting Officer      Commissioner of Patents and Trademarks